United States Patent Office 2,948,699
Patented Aug. 9, 1960

2,948,699

CONCRETE CONTAINING POLYMERS OF ALKYLIDENE BISACRYLAMIDE AND PROCESS OF MAKING

Roy William Roth and Daniel Elmer Nagy, Stamford, Conn., assignors to American Cyanamid Company, New York, N.Y., a corporation of Maine No Drawing. Filed Aug. 19, 1957, Ser. No. 679,055

6 Claims. (Cl. 260—41)

This invention relates to concrete which has a very rapid setting time and which has improved strength after completely hardening, and a method of making this concrete which comprises introducing a small but effective amount of a water soluble polymerizable mixture of a monomeric alkylidene bisacrylamide and another ethylenic comonomer with a suitable catalyst into the concrete as it is mixed. The monomeric alkylidene bisacrylamide and the ethylenic comonomer rapidly polymerize to give an initial strength which is at least sufficient to hold the concrete in position, so that in effect there is produced an aggregate filled polymer; and then the concrete itself hardens to produce a concrete the strength of which is increased by the presence of the polymer.

Concrete is one of the best known materials of construction and has been used for many years for many purposes. In using concrete, a water, cement and aggregate mixture is formed, put into place, and permitted to harden. There have been many attempts made to find methods of increasing the speed of hardening, or decreasing the speed of hardening, or of increasing the final strength of the material, and otherwise altering the characteristics of the concrete. Among these have been introducing materials such as a partially hydrolyzed polyacrylamide or polyacrylic acid or some similar such compound which at least under some conditions is a set retarder. The use of polymers in concrete for improving the strength or otherwise affecting the characteristics, as for example, increasing its water resistance, has been described elsewhere. Such materials were added primarily to affect the useful characteristics of the concrete in a desired manner.

Under some circumstances it is desirable that a concrete be formed which as soon as possible is able to bear its own weight and which can thus be released from forms, to avoid tying up an inventory of forms. Under some conditions a traveling form is used in which the form slips along the surface of the concrete so that the form is extruded from the concrete, leaving behind the concrete in a green condition as the form moves on. In the past it has been necessary that the period in the form be at least sufficient for the concrete to achieve sufficient set and strength that it would bear its own weight. This has limited the speed at which operations of this nature can be performed. In many other instances molds are used for the formation of concrete, as for example, in making concrete block or concrete pipe. Such block or pipe must be maintained in a mold until the concrete has sufficient strength that the mold can be removed without damaging the concrete. After the formation of the concrete and removal of the mold, the block or pipe or other article can be allowed to set without external load for sufficient time for the concrete to achieve all or an appreciable fraction of its final strength. After the concrete has achieved adequate strength, it may then be moved to final location or otherwise utilized. With these and many other processes it is, accordingly, desirable that the concrete achieve a very rapid set.

Under other circumstances, as for example, in use underwater or in certain types of underground formations, the concrete is placed but may be partially washed away by the action of water or permitted to flow away through the soil or underground formation unless the concrete can achieve a sufficient strength to be self-supporting within a comparatively short time.

By this invention it has been found that by using a monomeric alkylidene bisacrylamide and another ethylenic comonomer with a catalyst for the system in concrete, the concrete may be prepared and cast and rapidly attains sufficient strength to hold itself in position. The concrete then hardens as it stands and attains the full strength of ordinary concrete, or even greater strength resulting from the presence of the polymer therein. The polymer gives additional water resistance, additional hardness, and other desirable characteristics.

The setting time of the composition may be readily altered by the ratio of polymer to catalyst in a particular polymer system or by the choice of a polymer system which sets at a desired rate. The strength of the initial set resulting from the polymer itself may be varied depending upon the amount of polymer which is used and the exact characteristics of the particular polymer system used. As is obvious, the uses of concrete are so multitudinous that the specific requirements for the various uses vary to a considerable extent and the amount of polymer, the ratio of polymer to catalyst, and the conditions for use can be varied over a considerable range within the scope of this invention to achieve results which are desired under a particular set of conditions. A choice can be made which gives superior results under conditions which have previously been used, or it can be varied so as to give useful results under conditions which have previously been regarded as impossible. An increase in the amount of the polymer gives an increased early strength in which the strength is primarily the result of the polymer itself hardening. An increase in the amount of catalyst gives an increased rate at which the strength is developed. The absolute rates are in part a function of the particular bisacrylamide and ethylenic comonomer utilized.

The copolymerizable mixture which is added to the concrete contains between about 0.005 and about 0.3 part of a water soluble alkylidene bisacrylamide of the general formula:

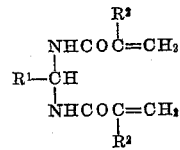

in which

is a hydrocarbon residue of an aldehyde and $R^2$ is of the group consisting of hydrogen and methyl. N,N'-methylene bisacrylamide is particularly suitable and is obtainable commercially. Some of these alkylidene bisacrylamides are described and claimed in Lundberg Patent 2,475,846. These alkylidene bisacrylamides or mixtures thereof may be used. These are cross-linking agents which give a cross-linking and, accordingly, rapid strength development to the polymer. Only slight solubility is required in view of the small amount used; therefore this component may have a water solubility as low as about 0.02% by weight at 20° C., but a solubility of at least 0.10% is more desirable.

The other comonomer is any solid, liquid or gaseous ethylenic compound (i.e., containing at least one

radical) of a solubility of at least about 2% by weight, and preferably at least about 5%, in water and which copolymerizes with the bisacrylamide in an aqueous system. Although not essential in practicing the invention, it is preferred to select an ethylenic comonomer that is capable of homopolymerization into polymers which are self-dispersible, and preferably soluble, in water with appropriate stirring. The dangling bonds in the formula may be attached to one or more of many different atoms or radicals including hydrogen, halogens such as chlorine and bromine, cyano, aryl, aralkyl, alkyl, and alkylene with or without solubilizing groups attached to these hydrocarbons. In addition, the substituents in the ethenoid may comprise one or more hydrophilic groups including formyl, methylol, polyoxyalkylene residues and quaternary ammonium salt radicals,

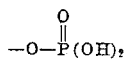

—OOCH, —OOCCH$_3$; —SO$_3$X, where X is H, NH$_4$, an alkali metal or an alkylamine; —CONR$_2$ and —CH$_2$CONR$_2$, where each R is hydrogen, alkylol, lower alkyl or a polyoxyalkylene radical; and —COOR' and —CH$_2$COOR', where R' is a H, NH$_4$, alkali metal, alkaline earth metal, organic nitrogenous base, alkylol, lower alkyl or polyoxyalkylene radical. The extremely large number of combinations and permutations of the various suitable substituents makes it impractical to list more than a few, relatively speaking, for illustrative purposes.

The water solubility of these substances is known to depend chiefly on the number and type of hydrophilic and hydrophobic radicals therein; for example, the solubility of compounds containing an alkyl radical diminishes as the length of the alkyl chain increases, and aryl groups tend to decrease water solubility, whereas aforesaid hydrophilic substituents all tend to improve the solubility of a given compound in water. Accordingly, the comonomer should be selected according to conventional chemical practice from those containing sufficient hydrophilic radicals to balance any hydrophobic groups present in order to obtain the requisite water solubility of monomer.

Among the water soluble ethenoid monomers, those containing an acrylyl or methacrylyl group are especially recommended. These are exemplified by N-methylol acrylamide, calcium acrylate, and methacrylamide; and the optimum results have been obtained with acrylamide. Among the other suitable ethenoid compounds are acrylic acid; other N-substituted acrylamides such as N-methyl acrylamide, dimethylaminopropylacrylamide, N-ethylol acrylamide, N-3-hydroxypropylacrylamide; acrylonitrile; saturated alkyl esters of acrylic acid, i.e. methyl acrylate, β-hydroxyethyl acrylate, β-aminoethyl acrylate, β-methyl aminoethyl acrylate; ethylene glycol and polyethylene glycol acrylates, as exemplified by the reaction product of β-hydroxyethyl acrylate or acrylic acid with about 1 to about 50 mols or more of ethylene oxide; salts of acrylic acid, i.e. magnesium acrylate, sodium acrylate, ammonium acrylate, zinc acrylate, guanidine acrylate and other organic nitrogenous base salts, as exemplified by diethylamine acrylate and ethanolamine acrylate; quaternary salts like alkyl acrylamidopropyl dimethylamino chloride; acrolein, β-carboxyacrolein, butenoic acid; α-chloroacrylic acid; β-chloroacrylic acid; as well as methacrylic acid and its corresponding derivatives. Also included are maleic acid and its corresponding derivatives including partial esters, partial salts, and ester salts thereof; maleamic, chloromaleic, fumaric, itaconic, citraconic, vinyl sulfinic, and vinyl phosphonic acids and their corresponding derivatives and mixtures thereof. Such derivatives and other suitable compounds include α,β-dichloroacrylonitrile, methacrolein, potassium methacrylate, magnesium methacrylate, hydroxyethyl methacrylate, zinc β-chloroacrylate, trimethylamine methacrylate, calcium α-chloromethacrylate, diethyl methylene succinate, methylene succindiamide, monomethyl maleate, maleic diamide, methylene malonamide, diethyl methylene malonate, methyl iso-propenyl ketone, ethyl vinyl ketone, propyl vinyl ketone, vinyl formate, vinyl lactate, vinyl acetate, vinyl bromoacetate, vinyl chloroacetate, vinyl pyrrolidone, allyl levulinate, allyl alcohol, methallyl alcohol, diallyl carbonate, allyl lactate, allyl gluconate, di(β-aminoethyl)maleate, di(methylaminoethyl)maleate, di(N,N-dimethyl β-aminoethyl)maleate, sulfonated styrene, vinyl pyridine, maleic anhydride, sodium maleate, ammonium maleate, calcium maleate, monopotassium maleate, monoammonium maleate, monomagnesium maleate, methyl vinyl ether, N-aminoethyl maleamide, N-aminoethyl maleimide, alkyl aminoalkyl maleamides, N-vinyl amines, N-allyl amines, heterocyclic ethenoid compounds containing nitrogen in a tertiary amino group, and the amine and ammonium salts of said cyclic compounds, N-vinyl acetamide, N-vinyl-N-methyl formamide, N-vinyl-N-methylacetamide, N-vinyl-succinimide, N-vinyl diformamide, N-vinyl diacetamide, vinyl sulfonyl chloride, vinyl sulfonic acid salts, vinyl sulfonic acid amides, vinyl oxazolidone, allyl amine, diallyl amine, vinyl methyl pyridinium chloride, and allyl trimethyl ammonium chloride to name only a few of the operative compounds.

Due care should be exercised in handling any toxic compounds such as monomeric acrylamide.

Polymerization of the vinyl groups of the compounds used in accordance with our invention is effected preferably with any of the usual water-soluble oxygen-containing catalysts, such as the ammonium, potassium and sodium persulfates, hydrogen peroxide, the alkali metal and ammonium chlorates and the like. It is generally desirable to use a redox catalyst system of an oxygen-containing compound with a reducing agent such as sodium thiosulfate, sodium or potassium bisulfite or metabisulfite, or an activator as an amine, such as nitrilotrispropionamide, etc., which catalysts are described in prior art. Polymerization has also been catalyzed with a reducing agent alone, such as sodium bisulfite.

The invention is not limited to any particular quantity of catalyst, but in general, more than about 0.1% based on the weight of polymerizable monomers is desirable. Over about 20% usually gives polymerization in too short a time to permit the concrete to be placed.

The time of gelation or polymerization is related to the amount of catalyst employed, and the induction period may be reduced within limits by increasing the amount of catalyst.

A period of set which is less than about 15 minutes is usually so short that the concrete cannot be placed and used within that time, although under some conditions where the mixing is extremely rapid and it is desired to have a set in less time, a set of 5 minutes or less is found useful. The variation in time is included within the scope of the present invention. The choice as to time is easily adjustable depending upon the particular use which is chosen.

Using the examples which follow as a basis, a quantity of catalyst can be chosen which gives the desired degree of polymerization within the desired time having due regard for the characteristics of both the cement being used and the aggregate being used in the concrete. The peroxy salts, such as ammonium persulfate, initiate the setting reaction. The addition of this compound may be delayed until just before the concrete is to be placed. Certain of the aspects of polymerization as related to the choice of catalysts is disclosed in Patent No. 2,801,984 of August 6, 1957, entitled "Resin-Forming Composition for Stabilization of Soil and Process of Using Same."

The method of mixing the concrete is not critical. Any of the standard methods for making concrete may be used and the bisacrylamide and the other ethylenic comonomer may be introduced either dry with the cement and sand, or in any desired order. Conveniently, the sand, gravel, and cement are dry mixed and to this mixture is added the water. It is convenient to dissolve the monomers in the water before it is added. The catalyst system may be mixed with additional water and added subsequent to the addition of the monomers, or it may be mixed with the aqueous solutions of the monomers when they are added to the cement aggregate blend. The order of addition is controlled more by the working conditions than any other factor, as any order of addition is satisfactory. It is particularly convenient to hold up the addition of the catalyst system until the concrete is ready for use and to add the catalyst system, preferably dissolved in water, a very short time before use, merely allowing sufficient time to blend the catalyst system uniformly through the mixture before it is placed.

The scope of the invention is as set forth in the accompanying claims. Certain embodiments thereof are illustrated by the following examples:

EXAMPLE 1

A mortar is prepared containing 500 parts of dry cement and 1,375 parts of dry Ottawa sand. The sand and cement are blended together. 1.75 parts of methylene bisacrylamide and 33.25 parts of acrylamide are added to 340 parts of water and dissolved therein. To this solution is added 3.5 parts of ammonium persulfate and 3.5 parts of sodium thiosulfate. As soon as these two parts of the catalyst system are dissolved in the water monomer solution, it is added to the sand cement mixture and mixed to form a mortar. The strength is tested as described in the American Society for Testing Materials designation C109–52.

In one particular run 28-day samples showed compressive strengths of 5,100, 4,900, and 5,000 pounds per square inch.

Control samples were prepared not containing the added monomers and ammonium persulfate and sodium thiosulfate using 500 parts cement, 1,375 parts of sand, and 270 parts of water. This composition had a lower water-cement ratio and would be expected to be stronger. On test at 28 days it showed strengths of 3,500, 4,000, and 3,500. This test shows that the 28-day strengths of mortars containing the methylene bisacrylamide-acrylamide polymer were markedly stronger than otherwise comparable mortars not containing them.

EXAMPLE 2

Concrete was prepared as in the preceding example substituting for half of the sand, a coarse gravel. Analogous strengths and improvements were obtained. As is to be expected in using a concrete in which the aggregate varies and the sand may vary, the results were not as uniform as those shown in Example 1 using Ottawa sand.

As is common in the concrete industry, the ASTM standards using Ottawa sand are used as a comparative basis even though a mortar of this particular composition is not normally used for construction, but instead a concrete containing gravel as at least part of the aggregate.

EXAMPLE 3

To a mixture of 50 parts cement and 137 parts sand dry blended is added 28 parts of a solution containing 2.68 parts acrylamide, 0.12 part methylene bisacrylamide, 0.14 part ammonium persulfate, 0.07 part nitrilotrispropionamide, and 25 parts of water. The solution is added to this sand cement mixture as soon as the catalysts are dissolved in the water. The mortar is promptly mixed and tested periodically with a Vicat apparatus as described in ASTM designation C191–52 for the setting time of hydraulic cement. The penetration of the Vicat needle as a function of time is shown in the following table. It is noted that the times of testing are markedly shorter than set forth in the ASTM test because when prepared in accordance with this example, the setting is so much shorter that the times described in the ASTM test would not be significant. Another test is run using 1.68 parts of 5% methylene bisacrylamide 95% acrylamide and comparable parts of ammonium persulfate and nitrilotrispropionamide.

The results are shown in the following table which shows the amounts of the polymer at the head of the table and the penetration in mm.

*Table 1*

PENETRATION OF VICAT NEEDLE VS. SET TIME

| Time, min. | Parts of Acrylamide-methylene bisacrylamide | | |
|---|---|---|---|
| | 0 | 1.68 | 2.80 |
| 3 | [1]30 | 30 | 30. |
| 6 | 30 | 30 | 30. |
| 8 | 30 | 30 | 27. |
| 10 | 30 | 30 | 10. |
| 12 | 30 | 30 | 1. |
| 14 | 30 | 30 | less than 1. |
| 16 | 30 | 28 | less than 1. |
| 18 | 30 | 24 | less than 1. |
| 20 | 30 | 19 | less than 1. |
| 25 | 30 | 5 | less than 1. |
| 30 | 30 | 1 | less than 1. |
| 60 | 30 | less than 1 | less than 1. |
| 120 | 30 | less than 1 | less than 1. |

[1] Penetration, expressed in mm. A reading of 30 mm. is the maximum penetration of the Vicat needle under the test conditions.

Without the addition of the monomers, the needle still penetrated to full depth after 120 minutes. With the smaller proportion of the monomers, a negligible penetration was obtained in 30 minutes, and with the larger quantity of the monomers, negligible penetration was obtained after 12 minutes.

As is obvious, the penetration time can be adjusted by changing the quantity of the polymer and the catalyst to any desired time; from a time so short that the concrete can barely be worked and placed; up to a time which is not appreciably shorted than obtained without the addition of the comonomers.

We claim:

1. Concrete of improved strength comprising at least 75% by weight stony aggregate and sand having incorporated therein a small but effective amount, from 0.05% to 2% by weight of said concrete, of a polymer from the polymerization in situ of a water soluble copolymerizable mixture comprising between about 0.5% and about 30% by weight of polymer of a monomeric alkylidene bisacrylamide of the formula:

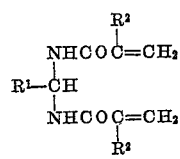

in which

is a hydrocarbon residue of an aldehyde and $R^2$ is a member of the group consisting of hydrogen and methyl, and the copolymerizable remainder of another ethylenic comonomer of at least about 2 percent by weight solubility in water at 20 degrees centigrade, which monomeric composition is convertible by a copolymerization reaction to a substantially water-insoluble mass, and the remainder essentially the hydration products of cement and water.

2. A composition according to claim 1 in which the alkylidene biscrylamide is N,N'-methylene bisacrylamide.

3. A composition according to claim 1 in which the ethylenic comonomer is acrylamide.

4. The process of producing a concrete of high strength and which sets sufficiently to remove forms in a short period which comprises admixing with Portland cement, stony aggregate, and sand, and water, from 0.05% to 2% by weight, of a water-soluble copolymerizable mixture comprising between about 0.5% and about 30% by weight of polymer of a monomeric alkylidene bisacrylamide of the formula:

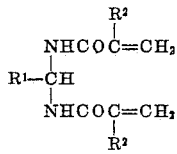

in which

is a hydrocarbon residue of aldehyde and $R_2$ is a member of the group consisting of hydrogen and methyl, and the copolymerizable remainder of another ethylenic comonomer of at least about 2 percent by weight solubility in water at 20 degrees centigrade, which monomeric composition is convertible by a copolymerization reaction to a substantially water-insoluble mass, and a hardening catalyst therefore, placing said wet mixture in final position, rapidly hardening said composition to form a cement and aggregate filled resin gel, then more slowly developing the cement-aggregate strength to form a resin containing concrete, in which the strength of the concrete is enhanced by the presence of the resin.

5. A process according to claim 4 in which the alkylidene bisacrylamide is N,N'-methylene bisacrylamide.

6. A method according to claim 4 in which the ethylenic comonomer is acrylamide.

References Cited in the file of this patent
UNITED STATES PATENTS

| | | |
|---|---|---|
| 2,801,984 | Morgan | Aug. 6, 1957 |
| 2,868,753 | Morgan | June 13, 1959 |